Figure 1:
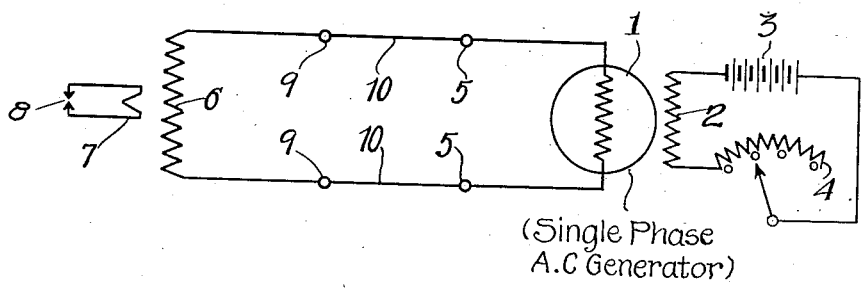

Jan. 15, 1929.

H. S. HOLMES 1,698,723

ELECTRIC SYSTEM

Filed Sept. 11, 1924

(Single Phase A.C Generator)

Inventor
Henry S. Holmes
By his Attorney
D. Anthony Usina

Patented Jan. 15, 1929.

1,698,723

UNITED STATES PATENT OFFICE.

HENRY S. HOLMES, OF NEW YORK, N. Y., ASSIGNOR TO THOMAS E. MURRAY, OF BROOKLYN, NEW YORK.

ELECTRIC SYSTEM.

Application filed September 11, 1924. Serial No. 737,122.

In the Murray Reissue Patent No. 15,466 of October 10, 1922, there is described a method of welding by pressing the parts together at their edges and passing across the joint a current of high ampere strength and brief duration; and in my application No. 689,878, filed February 1, 1924, there is described an electric system comprising a welding machine and a motor generator designed for carrying out the Murray process, particularly in large butt-welding operations. The present invention provides an improvement particularly designed for such electric systems, and applicable also to other combinations as hereinafter described.

In general it is assumed that any alternating current apparatus, such as the welding machine of my above application or a motor or other receiving apparatus designed for a certain voltage and frequency, will operate equally well on any commercial electric supply of that voltage and frequency, and of sufficient capacity. There are only a few commercial power plants capable of providing directly the power demanded by high powered alternating current welding machines of the resistance type, such as those described in my previous application, and this was one of the causes that led to the development of the fly-wheel motor generator set in connection with such a welding machine as described in said application.

In the use of such systems comprising a motor generator set directly connected to the welding machine, I have found that the suitability of the apparatus is not governed by the voltage and frequency alone. I found that a welding machine when connected to one generator received more power than when connected to a second generator of the same voltage and frequency, in spite of the fact that the first generator had a lower continuous kilowatt capacity than the second generator. After considerable experimenting I found that the useful output of the generator in such a system was brought to a maximum when the internal impedance of the generator was about equivalent to that of the welding machine.

Absolutely equivalent impedance is not always possible to attain on account of details of construction. But absolute equivalence in this respect is not necessary. There is a range through which the impedance of one may vary with respect to the other without any appreciable decrease in the power delivered by the generator to the welding machine. For example, the welding machine which I used had an impedance of .044 ohm. I first connected it to a 500 k. w. generator having a synchronous impedance of .132 ohm and did not get sufficient power. I then connected it to a 1000 k.w. generator having an impedance of .164 ohm and got less power. I then changed the armature windings of the first generator so that I had an impedance of .053 ohm and got sufficient power. In an attempt to get more power I changed the generator impedance to .037 ohm but found that I got the same power as before. Upon reducing the impedance of the generator still more I found that there was a decrease in the output of the generator. I then changed the impedance of the welding machine to be equivalent to that of the generator, that is .037 ohm but found no appreciable change in the power. By "approximately equivalent" I mean to cover the range through which the impedance may vary without any substantial change in the maximum useful result.

The invention is particularly important in connection with a generating apparatus of insufficient capacity to carry continuously the maximum current demanded by the receiving apparatus. An example is shown in my application above referred to where the welding machine is rated at 2400 kva. and the two-phase generator has a continuous rating of 500 kva. per phase but is capable of delivering 3000 kva. per phase for 4 seconds every 24 seconds. By providing approximately equivalent impedances in the generator and in the welding machine, this system or combination has been found very efficient. Thus I have found that a 2000 kva. welding machine connected to a 500 kva. generator with the correct internal impedance received more energy for 5 seconds 3 times a minute than when connected to a 1000 kva. generator with an incorrect internal impedance, the load being applied during the same intervals.

While I have conducted my experiments with a welding machine directly connected to a generator, it is also true that a motor or other apparatus for receiving alternating current energy directly connected to an alternating current source or delivering apparatus, will receive maximum power if the impedance in the two parts of the system are regulated in accordance with this invention to make them approximately equivalent; and this will be especially the case if the motor or other receiving apparatus is subjected to heavy overloads for short periods of time.

The invention is particularly important in installations of the character described where a generator is provided exclusively for a welding machine, or other receiving apparatus, or for a group of such machines, since in that case it is easily possible to design the two units of the combination with approximately equivalent impedances. In place of the generator referred to, various alternating current sources may be used, such as an ordinary static transformer.

The provision of greater or less internal impedance in the generator and in the welding machine may be secured in various ways known to electrical engineers. With a given generator the internal impedance may be increased or decreased by changing the number of conductors in the armature winding and varying their connections, bearing in mind that the voltage may be held at any given value by varying the excitation current. In a welding machine it is possible to design and construct it with an internal impedance approximately equivalent to that of a given generator with which it is to be used. This will be attained generally by designing the armature windings inside of the generator and the transformer windings in the welding machine to have substantially equivalent impedance; thus getting the maximum useful energy output from the generator and delivering all of such output to the welding machine.

Figure 2:
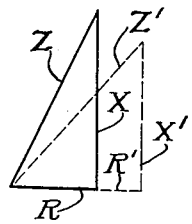

The annexed drawing illustrates diagrammatically in Fig. 1 the windings of a generator and welding machine such as are described in my application No. 689,878, above referred to. Fig. 2 is a vector diagram showing the components of the impedance.

In Fig. 1 the armature windings of a single phase alternating current generator are shown at 1 and the field windings at 2. It is assumed that the generator is driven by some satisfactory means at substantially constant speed. The field windings 2 are connected through the usual slip rings to a suitable source 3 of direct current. In the field circuit there is connected a variable resistance 4. The ends of the armature winding are brought out of the generator to the terminals 5.

The primary winding of the welding machine transformer is shown at 6 and the secondary winding, consisting of a single turn, at 7. The electrodes are indicated at 8. The ends of the primary winding 6 are brought out at the terminals 9.

The terminals 5 of the generator are connected to the terminals 9 of the welding machine by leads 10 which in practice are made as short as possible, of large cross-section and parallel and close to each other so that their impedance is negligible.

In such a construction the advantages of my invention are obtained by making the impedance of the armature winding 1 approximately equivalent to the impedance of the primary winding 6. In any particular case the values of these impedances will be determined by known methods and will therefore be modified as hereinafter described.

The usual method of determining the impedance of the generator is this. An ammeter, or other current measuring device, is short-circuited between the terminals 5 of the generator; and a second ammeter is connected in the field circuit, say between the coil 2 and the resistance 4. The generator is driven and the field current gradually increased by means of the variable resistance 4 until the armature current, as indicated by the ammeter between the terminals 5, reaches full load value; at which point the field current on the other ammeter is read and recorded. The field current is then reduced to zero, the ammeter removed from between the terminals 5 and these terminals connected through a volt meter. The field current is then gradually increased as before until it reaches the previous recorded value, when the terminal voltage of the generator is read on the volt meter between the terminals 5. This value in volts divided by the value of the full load current of the generator in amperes, as previously determined, gives the impedance of the generator in ohms.

The impedance of the welding machine is determined in a similar way. An ammeter is inserted in one of the leads connecting the primary 6 to a source of alternating current; and a volt meter is connected across the terminals 9. A weld is made between work pieces inserted in the electrodes 8. While the weld is being made the ammeter and volt meter are read simultaneously. The value of the volts divided by that of the amperes gives the impedance of the welding machine in ohms.

In case the impedances of the generator and of the welding machine should be substantially divergent one or both must be changed to bring them to approximate equivalence. How this is done is explained in connection with Fig. 2. The sides R, X and Z represent respectively the values of the resistance, reactance and resulting impedance; the square of the impedance being equal to the sum of the squares of the other two. Or, algebraically, the relation is generally expressed thus,—$R^2$ plus $X^2$ equals $Z^2$. The impedance Z, therefore, is the square root of the sum of the squares of the resistance and the impedance. It follows that the impedance may be varied by changing the resistance in the machine in question or the reactance or both. This fact is illustrated by dotted lines in Fig. 2, showing a second triangle of forces in which the impedances Z and Z' are equal, but the reactances X and X' are not equal nor the resistances R and R'.

In applying this principle to the generator or the welding machine, the reactance of the winding may be varied by changing the number of turns or the spacing thereof. The resistance may be varied by changing the cross-section or the length of the conductors.

Though I have described with great particularity of detail certain embodiments of my invention, yet it is not to be understood therefrom that the invention is restricted to the particular embodiments disclosed. Various modifications thereof may be made by those skilled in the art without departing from the invention as defined in the following claims.

What I claim is:

1. An electric system comprising a source of alternating current connected electrically to an electric welding machine, said source being of insufficient capacity to supply continuously the maximum current demanded by the welding machine, the impedance of said source being approximately equivalent to the impedance of the welding machine.

2. An electric system comprising an alternating current generator electrically connected to an electric welding machine, the generator being of insufficient capacity to supply continuously the maximum current demanded by the welding machine, the impedance of the generator being approximately equivalent to the impedance of the welding machine.

3. An electric system comprising an alternating current generator of the recuperative type electrically connected to an electric welding machine, the generator being of insufficient capacity to supply continuously the maximum current demanded by the welding machine and requiring an interval for recuperation between welds, the impedance of the generator being approximately equivalent to the impedance of the welding machine.

In witness whereof, I have hereunto signed my name.

HENRY S. HOLMES.